US006222607B1

(12) United States Patent
Szajewski et al.

(10) Patent No.: US 6,222,607 B1
(45) Date of Patent: Apr. 24, 2001

(54) SYSTEM AND METHOD FOR PROCESS AND/OR MANIPULATING IMAGES

(75) Inventors: Richard P. Szajewski; Allan F. Sowinski, both of Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/456,613

(22) Filed: Dec. 8, 1999

(51) Int. Cl.[7] ........ G03B 27/52; G03D 13/00

(52) U.S. Cl. ........ 355/27; 355/77; 355/40; 396/567; 396/578

(58) Field of Search ........ 396/567, 578, 396/564, 626; 355/40, 41, 68, 77, 27–29; 358/487, 527; 399/8

(56) References Cited

U.S. PATENT DOCUMENTS

| | | | | |
|---|---|---|---|---|
| 4,872,033 | | 10/1989 | Watanabe et al. | 396/622 |
| 4,965,626 | | 10/1990 | Robison et al. | 355/40 |
| 4,987,439 | | 1/1991 | Cloutier | 355/40 |
| 5,025,283 | | 6/1991 | Robison | 355/40 |
| 5,151,726 | | 9/1992 | Iwashita et al. | 355/40 |
| 5,194,892 | | 3/1993 | Robinson | 355/40 |
| 5,291,420 | | 3/1994 | Matsumoto et al. . | |
| 5,319,401 | | 6/1994 | Hicks | 355/40 |
| 5,477,353 | * | 12/1995 | Yamasaki | 358/487 |
| 5,512,396 | | 4/1996 | Hicks | 355/40 |
| 5,726,737 | | 3/1998 | Fredlund et al. | 396/319 |
| 5,926,255 | * | 7/1999 | Kimura | 355/40 |
| 6,104,877 | * | 8/2000 | Smart et al. | 396/311 |

FOREIGN PATENT DOCUMENTS

| | | | | |
|---|---|---|---|---|
| 63-4370 | * | 1/1988 | (JP) | 355/40 |
| 11-298722 | * | 10/1999 | (JP) | 355/40 |
| 11-338062 | * | 12/1999 | (JP) | 355/40 |

OTHER PUBLICATIONS

*Using Technet Center*, User's Guide for TECHNET—Kodak Technical Assistance Network; Eastman Kodak Company, Kodak Publication No. Z–10–XB; pp. 1–1–18–2.

* cited by examiner

*Primary Examiner*—D. Rutledge
(74) *Attorney, Agent, or Firm*—David A. Novais

(57) ABSTRACT

A digital photofinishing station is capable of being loaded with one or more distinct films in need of photofinishing. The digital photofinishing station has the capability to identify the film and apply a specific correction algorithm based on the identified film. More specifically, the digital photofinishing station is capable of handling films of different density forming properties, process these films using a common developing process, and apply a proper correction algorithm based on the type of film. Further, chemical constituents of the developer solution in the development process can be monitored, and based on known deviations in development caused by specific deviations in the developer solution, a proper correction algorithm is applied. In a further feature of the present invention, film can be developed and scanned at the digital photofinishing station. When the proper correction algorithm for either the film type or the developing solution deviations is not available locally, a remote server can be accessed.

32 Claims, 5 Drawing Sheets

SYSTEM AND METHOD FOR PROCESS AND/OR MANIPULATING IMAGES

FIELD OF THE INVENTION

The present invention relates to a processing system and/or method for processing and/or manipulating digital images. More specifically, the present invention relates to the concept of updating photofinishing control software and algorithms to correspond to specific film codes that require distinctive image handling.

BACKGROUND OF THE INVENTION

In a typical digital photofinishing environment, films are developed, scanned and/or digitized to yield corresponding digital images which are then computer processed (such as for color balance, density, etc.) to yield final digital images. The final digital images may be printed by a laser or other digital printer, to provide customer service prints and/or uploaded to a remote hub for later consumer access and/or copied onto a diskette, optical disk (Photo CD) or the like.

Parameters which the photofinishing processor uses to control (a) the chemical processing (for example, development time in the case of development of a conventional film, and contact time and temperature in the case of development of a photothermographic film); (b) the scanner which scans the film (for example, illumination control, degree of specularity); and (c) the digital image processing of the digital images (for example, color balance), may preferentially have different settings which depend on film type or history. For example, images captured on film specifically designed for scanning may produce poor images if handled by the scanner or image processor in the same manner as conventional film images.

Photofinishing processes are typically loaded with the appropriate software and algorithms to control chemical processing, scanning and digital image processing at set up and delivery. Software upgrades are made available for loading by trained operators who much visit each and every site to reload and reset the photofinishing processor.

A drawback with the above procedure is that the software and algorithm collection can be quickly outdated as manufactures supply improved films with different properties, as improved digital manipulations become available and as consumers request new and different image choices and features which require changed image processing. While it is possible to manually update the software and algorithm collection by supplying such code to trained operators and having them reload the code, this manual intervention can be expensive and difficult to implement on a recurring basis. It is especially troublesome when the software and algorithms have a limited life and must be simultaneously enabled and disabled on a worldwide basis as is the case with a marketing promotion. The problem becomes nearly impossible to adequately address with highly geographically dispersed photofinishing as occurs with minilabs, with self-standing digital imaging labs in stores, with kiosk-like digital image processing stations and with the advent of home photofinishing opportunities.

SUMMARY OF THE INVENTION

An object of the present invention is to provide for a processing system and method for processing and/or manipulating digital images, and more specifically, to a system and method for regularly updating the control parameters (i.e. control software) for digital finishing photofinishing stations.

A further object of the present invention is to provide for a system and method of updating the control parameters for a digital photofinishing station on demand.

A further object of the present invention is to provide for a system and method which update the control parameters for a digital photofinishing station in response to film codes read from a supplied film.

A further object of the present invention to provide for a system and method which updates the control parameters for a digital photofinishing station in response to a remote signal.

The present invention relates to a processing system which comprises a reader that obtains a digital record of images on film supplied to the processing system; a film type identifier that identifies a film type of the film; and a controller that receives a signal from the film type identifier indicative of the film type of the film. When the identified film type is one which is recognized by the controller, the controller applies a modifying algorithm to the digital record to create a first modifying digital record of the images based on the identified film type.

The present invention further relates to a system for manipulating digital images. The system comprises a reading device that obtains a first digital record of first images obtained from a first film type and a second digital record of second images obtained from a second film type. The first and second film types each have a different output response after being exposed to the same development process for development of the first images on the first film type and the second images on the second film type. The system further comprises a controller that applies a first computer algorithm to the first images obtained from the first film type so as to provide a first modified digital record of the first images having a first predetermined color characteristic, and applies a second computer algorithm to the second images obtained from the second film type so as to provide a second modified digital record of the second images having a second predetermined color characteristic.

The present invention further relates to a processing method which comprises the steps of reading a film to obtain a digital record of images on the film; identifying a film type of the film; and providing information regarding the film type of the film to a controller. When the identified film type is recognized by the controller, the controller applies a modifying algorithm to the digital record to create a first modified digital record, with the modifying algorithm being based on the identified film type and being stored in the controller. When the identified film type is not recognized by the controller, the controller accesses a remote server that is adapted to identify the film type not recognized by the controller and provide a remote algorithm to the controller. This remote algorithm is applied to the digital record to create a second modified digital record. The remote algorithm is based on the film type identified by the remote server.

The present invention further relates to a method of manipulating digital images. The method comprises the steps of obtaining a first digital record of first images obtained from a first film type and a second digital record of second images obtained from a second film type. The first and second film types each have a different output response after being exposed to the same development process for development of the first images on the first film type and the second images on the second film type. The method comprises the further steps of applying a first computer algorithm to the first images obtained from the first film type so as to provide a first modified digital record of the first images having a first predetermined color characteristic, and applying a second computer algorithm to the second images from the second film type so as to provide a second modified digital record of the second images having a second predetermined color characteristic.

The present invention further relates to a computer program product which comprises a computer readable storage medium having a computer program thereon which when loaded into a computer, causes the computer to perform the following steps: read a film to obtain a digital record of images on the film; identify a film type of the film; and provide information regarding the film type of the film to a controller. When the identified film type is recognized by the controller, the controller applies a modifying algorithm to the digital record to create a first modified digital record, with the modifying algorithm being based on the identified film type and being stored in the controller. When the identified film type is not recognized by the controller, the controller accesses a remote server which is adapted to identify the film type not recognized by the controller and provide a remote algorithm to the controller which is applied to the digital record to create a second modified digital record. The remote algorithm is based on the film type identified by the remote server.

The present invention further relates to a processing system which comprises a reader for obtaining a digital record of images from an electronic image bearing file supplied to the processing system; an image capture device type identifier which identifies an image capture device type of the file; and a controller which receives a signal from the image capture device type identifier indicative of the image capture device type of the file, such that when the identified image capture device type is one which is recognized by the controller, the controller applies a modifying algorithm to the digital record to create a first modified digital record of the images based on the identified image capture device type.

The present invention further relates to a processing method which comprises the steps of: reading an electronic image bearing file to obtain a digital record of images from the file; identifying an image capture device type of the file; and providing information regarding the image capture device type of the file to a controller. When the identified image capture device type is recognized by the controller, the controller applies a modifying algorithm to the digital record to create a first modified digital record. The modifying algorithm is based on the identified image capture device type and is stored in the controller. When the identified image capture device type is not recognized by the controller, the controller accesses a remote server which is adapted to identify the image capture device type not recognized by the controller and provide a remote algorithm to the controller which is applied to the digital record to create a second modified digital record. The remote algorithm is based on the image capture device type identified by the remote server.

The present invention further relates to a computer program product which comprises a computer readable storage medium having a computer program thereon which when loaded into a computer, causes the computer to perform the following steps: read an electronic image bearing file to obtain a digital record of images from the file; identify an image capture device type of the file; and provide information regarding the image capture device type of the file to a controller. When the identified image capture device type is recognized by the controller, the controller applies a modifying algorithm to the digital record to create a first modified digital record. The modifying algorithm is based on the identified image capture device type and is stored in the controller. When the identified image capture device type is not recognized by the controller, the controller accesses a remote server which is adapted to identify the image capture device type not recognized by the controller and provide a remote algorithm to the controller which is applied to the digital record to create a second modified digital record. The remote algorithm is based on the image capture device type identified by the remote server.

An advantage of the system and method of the present invention is that it permits an update of a digital photofinishing station and more specifically, an update of the software of the digital photofinishing station that is responsive to film codes. This enables widely dispersed and optionally unattended digital photostations to properly respond to an ever changing set of workloads and customer requirements in a timely fashion.

DETAILED DESCRIPTION OF THE INVENTION

Figure 1:
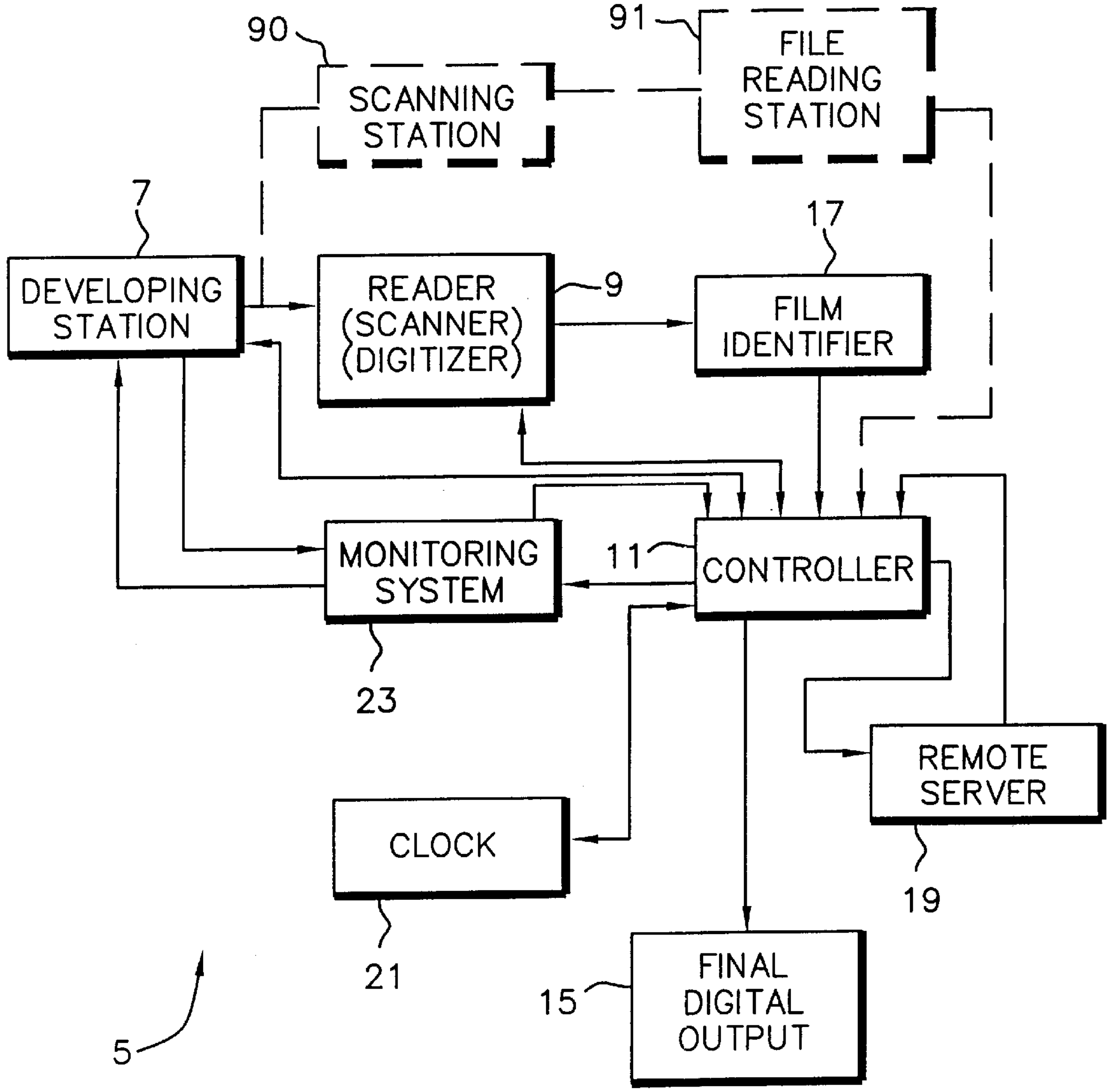
FIG. 1 is a schematic illustration of a photofinishing station in accordance with the present invention.

Referring now to the drawings, wherein like reference numerals represent identical or corresponding parts or steps throughout the several views, FIG. 1 schematically illustrates a digital photofinishing station 5 that is capable of being loaded with one or more films of different types in need of digital photofinishing. This digital photofinishing can take the form of (a) optional chemical processing in a developing station 7 to develop an exposed film; (b) scanning of an exposed and developed film and digitizing the scanned image at a reader/scanner station 9; and (c) digitally manipulating a digitized image at a controller 11 to provide for a final digital output 15 in the form of finished images to customers; such as, hard copy prints, soft display images, or digital files which can be stored or transmitted to remote locations. A digital printer such as a laser printer, a thermal printer, an LED printer or an LCD printer can be used to print the final digital output.

In a first feature of the present invention, after the film is scanned and digitized at station 9 to form a digital record of images on the film, the film is identified at a film identification station 17. Reader/scanner station 9 can include a digital scanner such as a film scanner. After the film is identified, a signal with respect to the type of film is provided to controller 11. Controller 11 can be a computer or central processing unit having a memory which is adapted to store a plurality of computer photofinishing and/or transformation algorithms. Also, the system of the present invention can be implemented in the form of a computer program product in which a computer storage medium having a computer program thereon is loaded into controller 11 to cause controller 11 to perform digital processing and/or manipulation in the manner described in the present application.

After receiving the signal from film identification station 17 with respect to the type of film, controller 11 determines if the film type is known. That is, controller 11 checks to see if the algorithm for the identified film type is stored in the memory of controller 11. If the film type is known, controller 11 applies the stored computer algorithm based on the known film type to the digital record of the image on the film to form a modified digital record. This modified digital record, is then applied as a final digital output 15 as described above. Therefore, a first film type could be associated with a first computer algorithm which is applied to the digital record to form a first modified digital record, and a second film type could be associated with a second computer algorithm which is applied to the digital record to form a second modified digital record. In this embodiment, films of different density forming properties can be processed, using a common development process, and a proper correction algorithm can be chosen by controller 11 based on the film type. Final digital output 15 for each film type can have a predetermined color characteristic based on the selected algorithm.

With respect to film types, these can be films that are to be distinguished one from another based on purposeful chemical or mechanical formulation specifics, response to light, response to chemical, thermal or mechanical processing specifics, image forming characteristics, and batch-to-batch changes. The term further refers to films that are to be distinguished one from another in the image processing or digital manipulation that is to be applied to images captured thereon in response to customer specifications. It is intended that this latter distinction can be applied on per batch, per roll or even per image basis.

With respect to film-type identifiers on the film, these could be DX, IX, on-film magnetics, on-cartridge magnetics, on-cartridge chips, and on-film optics, which could be visible or infra-red As one option, the film can be placed in a film enclosure, a canister, a cartridge which includes a suitable id, or the film strip itself can include a suitable id code related to film type and intended photofinishing. As described above, this code can be carried on the film in a magnetic, optical or mechanical manner. In a further feature of the invention, the code can be carried in a magnetic, optical or mechanical manner on the film package or cassette. Also, as described above, the code can be carried on a microchip located on the film or its container. Further, the code can be a serial number uniquely identifying each roll of film.

Figure 4A:
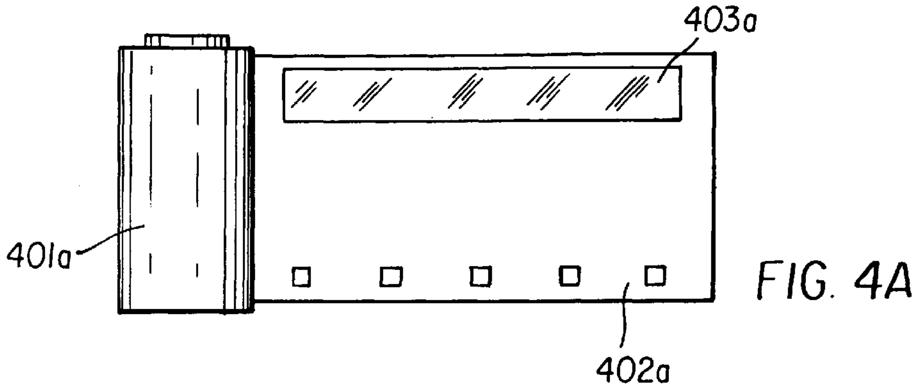
FIG. 4A is an illustration of a film bearing an optically readable region having an identification for film type.
Figure 4B:
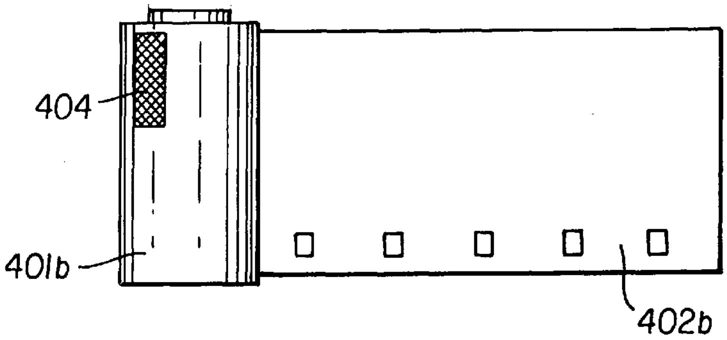
FIG. 4B is an illustration of a film cartridge bearing an interrogatable microchip having an identification for film type.
Figure 4C:
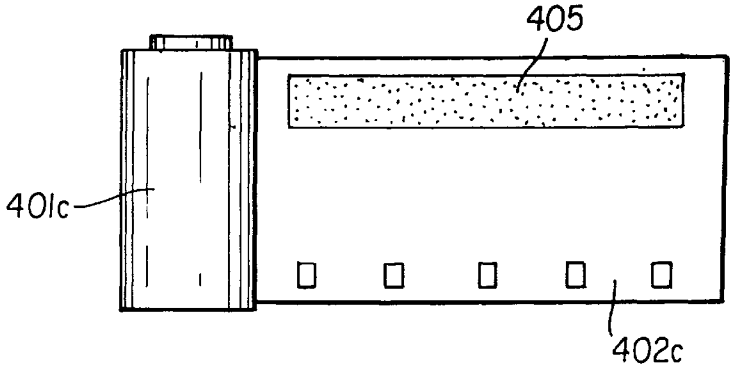
FIG. 4C is an illustration of a film bearing a magnetically readable region having an identification for film type.
Figure 4D:
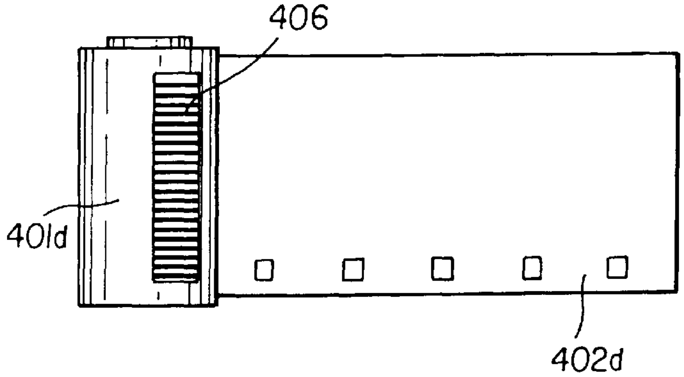
FIG. 4D is an illustration of a film cartridge bearing an optically readable serial number for identifying film type.

FIG. 4A illustrates a film cartridge 401*a* containing a film 402*a* in roll form. Film 402*a* is shown partially withdrawn from cartridge 401*a*. Film 402*a* bears an optically readable region 403*a* having an identification for film type. Optically readable region 403*a* may be fully readable before film development or it may be in latent form and readable only after film development. FIG. 4B illustrates a film cartridge 401*b* containing a film 402*b* in roll form. Cartridge 401*b* bears an interrogatable microchip 404 having an identification for film type. FIG. 4C illustrates a film cartridge 401*c* containing a film 402*c* in roll form. Film 402*c* bears a magnetically readable region 405 having an identification for film type. FIG. 4D illustrates a film cartridge 401*d* bearing an optically readable serial number 406 for identifying film type. In another embodiment, region 406 can be a magnetically readable region.

Thus, with reference to the above described embodiment, the code can be read at film identification station 17. Film identification station 17 can include an optical, magnetic, mechanical or digital reader as appropriate to the manner to which the code is carried and which is adapted to read the code. The code is then passed from film identification station 17 to controller 11 and the memory within controller 11 is searched for detailed operating instructions responsive to the code. If the code is known in the memory of controller 11, controller 11 proceeds to retrieve development control parameters or algorithms from the memory and applies the appropriate parameter or algorithm to the film. For example, the appropriate digitization, image processing and image management algorithms and tables can be accessed from the memory of controller 11 and used to digitally process the developed and scanned image as instructed. As a further option, instructions can be given to the developing station relating to parameters and algorithm is with respect to developing the film. As a yet further option, film identification station 17 can include a film type identifier which identifies a film based on an output response of the film to the chemical development process at developing station 7.

In a further feature of the present invention, in the event that the code on the film or canister is not recognized by controller 11, controller 11 will instruct digital photofinishing station 5 to call a remote server 19 and download the required control parameters, such as control software, algorithms and tables. The downloaded parameters are written into the memory of controller 11 and passed to photofinishing station 5 which proceeds as above. The control parameters or algorithms are applicable with respect to applying the appropriate digitization algorithms. Controller 11 then outputs the final digital output at 15. When controller 11 accesses remote server 19, it will typically employ a module that can communicate with remote server 19. This module may be a modem which interacts over a telephone system. It may also be an internet online connection or it may be a wireless connection as is known in the art.

More specifically, remote server 19 can be a computer which can be accessed by direct data links such as by direct cabling, phone lines, and the Internet, or by wireless data links such as radio frequency, infrared or optical transmission. Server 19 stores a database of files, each file holding the control parameters required to properly process an image. Each film has an identifier that associates it and its held control parameters with an image capture device type that is preferably a film type. On receiving a request from controller 11, server 19 searches its database of files to identify the file holding the control parameters required to properly process the images captured by the particular image capture device type. When the proper file is identified, server 19 transmits the files to controller 11. Each file can be associated with one or more image capture device types. However, each image capture device type can be associated with only one file at the server level. Both server 19 and controller 11 can comprise means to authenticate one to the other, to transmit and receive information one from the other in encrypted form, and to ensure the fidelity of the transmitted information. Server 19 can be a single unit. Preferably, it can be a network of redundant units configured to provide continuous service to a plethora of geographically distributed individual controllers.

In a further feature of the present invention, a clock 21 can be associated with controller 11, and in response to the passage of time based on clock 21, controller 11 can access remote server 19 to negotiate a download of control parameters and algorithms, and store these control parameters and algorithms in the memory of controller 11.

Figure 2:
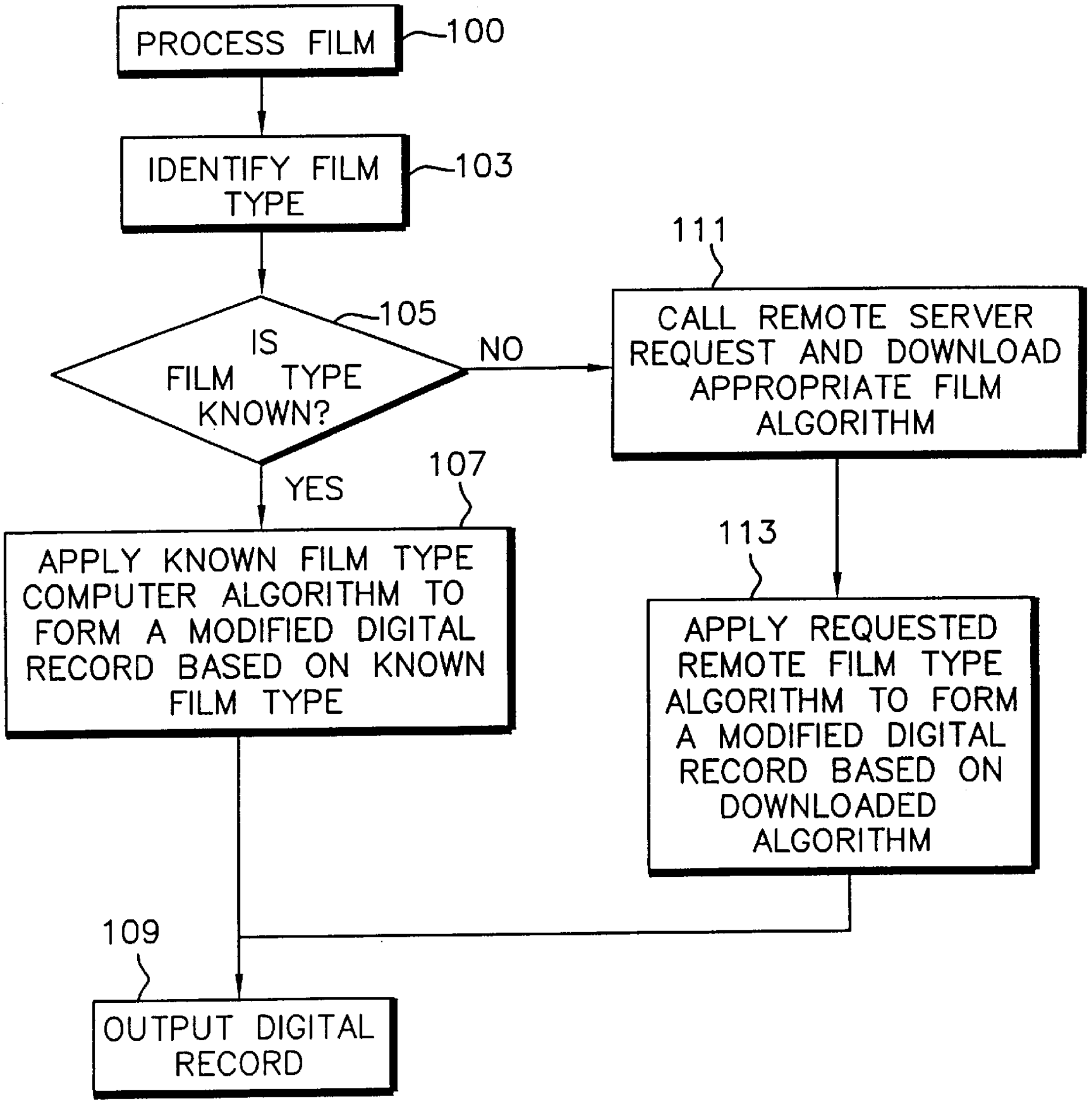
FIG. 2 is a flow chart showing an operation of a first embodiment of the present invention.

FIG. 2 illustrates a work flow diagram in accordance with an embodiment of the present invention which is based on the system illustrated in FIG. 1. In the work flow diagram of FIG. 2, films are identified and a proper correction algorithm is just chosen based on the type of film. More specifically, in step 100, processed film is supplied to a film-type identifier where the film type of the film is identified (step 103). The film is then passed to controller 11, where it is determined if the film type is known or stored within the memory of controller 11 (step 105). If the film type is known, the proper correction algorithm is applied (step 107), for example, for scanning control. At that point an output digital record is realized (step 109). If at step 105 the film type is not recognized by the memory of controller 11, controller 11 accesses a remote server (step 111), which retrieves the proper correction algorithm based on the film type and applies the correction algorithm to the film (step 113). The appropriate digital record is then outputted (step 109).

With the process of FIG. 2, if the films have different density forming properties and are processed using a common developing process, it is possible to provide the proper correction algorithm for different film types based on the identified film type.

In another embodiment, implementation or variation schematically shown by dashed lines in FIG. 1, the exposed film can be processed at developing station 7 and scanned at a scanning station 90 to form an electronic image bearing file representative of the original image and carrying a film type identifier. This electronic image-bearing file, whether digital or analog in character, can be stored using a persistent or transient information storage means as known in the art. Suitable forms of information storage means include but are not limited to both permanent and re-writeable optical media, magnetic means, intermediate films, random access memory and the like. In this embodiment, an image capture device identifier in the form of a file reading station 91 suitable for retrieving the stored electronic image bearing file from the information storage means, can replace reader/scanner station 9. When file reading station 91 is present, it can further be employed to retrieve an electronic image bearing file derived from any image capture means including but not limited to both digital and analog scanners, cameras and video image capture devices. When file reading station 91 is present and employed in this manner, the term "film" shall be interpreted to mean "electronic image bearing file" and the term "film type" shall be interpreted to means "image capture device type". In a preferred embodiment, the processing system and method of the present invention is adapted to employ both reader/scanner station 9 and file reading station 91. The stations then enable the processing system, the system for manipulating digital images, the computer program product and the method to treat images derived from any source to provide a final digital output 15.

Figure 3:
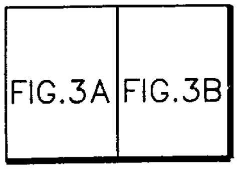
FIGS. 3, 3A and 3B illustrate a further flow chart showing an operation of a second embodiment of the present invention.
Figure 3A:
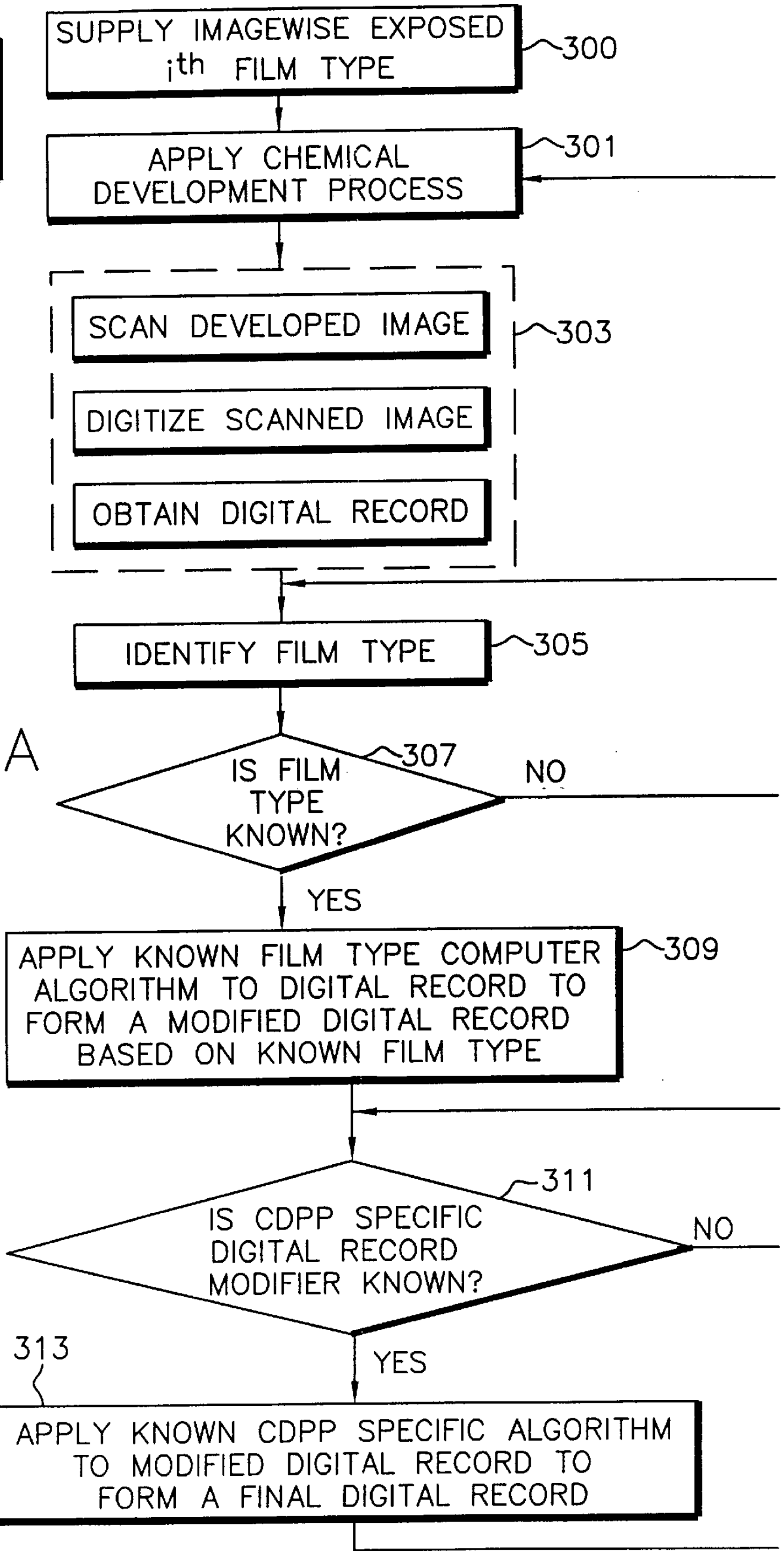
Figure 3B:
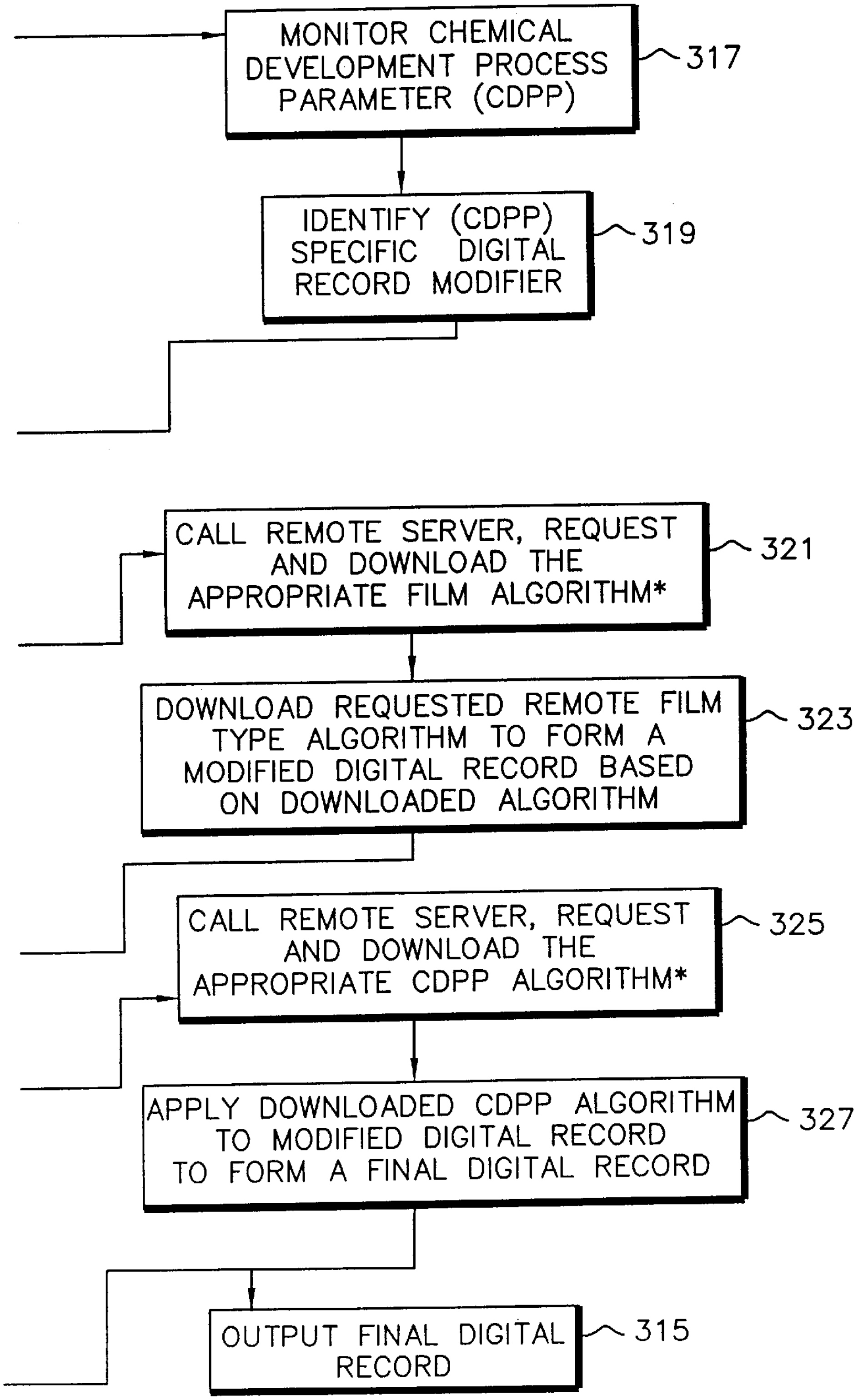

FIGS. 3, 3A and 3B illustrate a further embodiment of the present invention which is also based on the system illustrated in FIG. 1. More specifically, FIGS. 3, 3A and 3B illustrate a work flow diagram in accordance with a further feature of the present invention. In the process of FIGS. 3A–3B, chemical constituents of developer solution at development station 7 are monitored, and based on known deviations in development caused by specific deviations in the developer solution, proper correction and/or transformation algorithms are applied. Further, a film is developed and scanned, and when the proper correction algorithms for either the film type or the development solution deviation is not locally available, the algorithm can be obtained from a remote server.

Referring now to FIGS. 3A and 3B, in the case when both the film type and chemical development process parameters utilizing the chemical development process are known, the process proceeds as follows. First, an imagewise exposed $i^{th}$ film type (step 300) is supplied to a chemical development process at developing station 7 (step 301). The developed film is thereafter scanned and digitized to obtain a digital record (step 303). Also, the chemical development process parameter at developing station 7 is monitored (step 317), and a specific digital record modifier with respect to the chemical developing process is identified (step 319). Items which can be monitored at development station 7 include but are not limited to temperature, ph, alkalinity, developing agent concentration, iodide ion concentration, bromide ion concentration, chloride ion concentration, film residence time, etc. Next, the film type is identified (step 305) and it is determined if the film type is known (step 307). Since in this described example, both the film type and the chemical development process parameter are known, the answer to step 307 is yes, and controller 11 applies a known film-type computer algorithm and/or transformation algorithm to the digital record to form a modified digital record based on the known film type (step 309). Additionally, in step 311, it is determined if the specific digital record modifier with respect to the chemical development process is known. Since in this example, the answer is yes, the controller applies a known specific chemical development algorithm to the modified digital record to obtain a final digital record (step 313), and the system outputs a final digital record (step 315). As previously explained, the computer algorithms can be used to control or modify development and/or scanning.

In the case where both the film type and the chemical developing process are not known, the answer in step 307 would be no, and the system would proceed to step 321, where remote server 19 is accessed. At this point, controller 11 requests remote server 19 to provide and download the appropriate film-type algorithm. In step 323, the remote film-type algorithm is downloaded to form a modified digital record based on the downloaded algorithm. Additionally, in step 311, it is determined that the specific digital record modifier with respect to the development process is not known, and the process again requests access to remote server 19 which downloads the appropriate chemical development process parameter algorithm (step 325). It is recognized that the present invention is not limited to one remote server 19 and that several distinct remote servers can be accessed depending on the information required. Next, the algorithm is applied to the modified digital record (step 327) to form a final record, and the final digital record is outputted (step 315). The algorithms received from the remote serve can be used to control development and for scanning adjustments.

In monitoring the chemical development process in developing station 7, and determining if the digital record modifier with respect to the chemical process is known (steps 317, 319 and 311), the monitoring system monitors chemical constituents of the processing solution at the developing station. That is, the monitoring system identifies the chemistry based digital record modifier based on deviations in development caused by specific deviations in the processing solution and provides a signal to controller 11 indicative thereof. If the chemistry based digital record modifier is recognized by the memory of controller 11, controller 11 applies a chemical development correction algorithm to the digital record. If the chemistry based digital record modifier is not recognized by the memory of controller 11, controller 11 calls remote server 19 as described above to request a remote chemical development correction algorithm. Controller 11 thereafter applies the remote development correction algorithm to the digital record as also described above.

The process of FIGS. 3A–3B is also applicable when the film type is known and the chemical development process is not known. For example, if the film type is known, in step 307, the answer would be yes, and the known film type computer algorithm is applied to the digital record to form a modified digital record (step 309). In step 311, it is determined that the specific digital record modifier with respect to the chemical development process is not known. Controller 11 then accesses the remote server (step 325), and the appropriate algorithm is downloaded from the remote server (step 327) which leads to the output of the final digital record (step 315).

The process of FIGS. 3A–3B is also applicable when the film type is not known while the chemical development process is known. In this case, if the film type is not known, the answer to step 307 would be no, at which time, controller 11 will access the remote server (step 321), to download the appropriate computer algorithm and form a modified digital record (step 323). Next, the system proceeds to step 311, where it is determined that the specific digital record modifier with respect to the chemical development process parameter is known. Controller 11 thereafter applies the known specific algorithm to the modified digital record to form a final digital record (step 313), and the final digital record is outputted (step 315).

Therefore, the system of the present invention, is applicable to processing films of different types which pass through the same development process. Controller 11 can apply a first computer algorithm to first images obtained from a first film type so as to provide for a first modified digital record of the first images having a first predetermined color characteristic, and apply a second computer algorithm to second images obtained from a second film type so as to provide for a second modified digital record of the second images with a second predetermined color characteristic. If the first or second computer algorithms are not recognized by the memory of controller 11, controller 11 can access remote server 19 to download the appropriate algorithm. Further, in the system of the present invention, rather than reading control patches which are being chemically processed, the specific film type is identified and specific correction algorithms are applied based on the film type. The present invention is particularly applicable to an APS cartridge film and also to pre-exposed color-sensitometric control patches. Also, the density readings obtained from on-film sensitometric and control patches can be used to achieve even finer tone and color control.

In a further feature of the process of the present invention, it is noted that controller 11 can be adapted to suspend photofinishing while retrieving the needed control parameters from remote server 19. In a still further feature, controller 11 can cause the film related to a particular order to be physically set aside, and the processing which is to be completed to be held in memory. It proceeds with other orders, and in parallel seeks instruction updates as already described above. After these updates are in memory, it returns to the set aside order for completion. In a further implementation, controller 11 can cause the film related to a particular order to be ejected with an indication to set aside, and in parallel seek instruction updates from remote server 19 as described above. After these updates are in memory, it requests the set aside order for completion.

In a further implementation of the invention, the photofinishing station can include a sensor, and rather than responding to the step of identifying film types or the chemical development process parameter, the sensor can automatically instruct controller 11 to call remote server 19 to negotiate the download of control parameters, software, algorithms and tables, and store these parameters in the memory of controller 11.

Examples of items on the film code which can cause controller 11 to request instructions with respect to processing, include but are not limited to, partial roll processing, changes in the time and temperature of processing, processing character, i.e. wet or dry, the type of wet processing (i.e. black and white or color, negative, reversal), the extent of wet processing, i.e. development only or development followed by partial or complete desilvering, or the type of dry or photothermographic processing, (i.e. with or without the application of an activator and with or without the use of a processing sheet) as is known in the art.

The type of instructions on the film codes which will cause controller 11 to request instructions with respect to film scanning and digitization, include but are not limited to, illumination color, power and specularity, scanning bit depth, the use and choice of color filters, lens choice, transmission vs. reflection mode, and scanning resolution.

The type of instructions on the film codes which will cause controller 11 to request instructions with respect to film digital processing, include but are not limited to, instructions related to film specific color and tone rendition, color balance matrices and look-up tables, the use of noise suppression algorithms and the use of edge enhancement algorithms. They may also include customer specific preferences related to degree of color saturation, cropping, enlargement, print number, inclusion of specific effects and distortions, over-printing of images, frames and the like. The film code can also include reference to film storage, camera usage and chemical processing history as an aid in chemistry construction.

Further, when the digital photofinishing station has an optical printing capability, the code may instruct the station as to whether and how to best optically print an image from the film.

The chemical development, scanning, digitization and image processing do not necessarily have to be done at one digital photofinishing station. A film could be processed at one station and the processed film delivered to a distinct digital photofinishing station for scanning, digitization and photofinishing. These later steps can be done in a compact unit at home/office/etc. The compact unit may be the size and shape appropriate for mounting in a computer drive bay.

The code reader could simply be the scanner itself, which reads an optical code from the film/paper print. As a further option, when the computer of the scanner/image processor recognizes that the required film parameters can not be found locally, it may simply upload the scanned digital image and the film code to a remote site for processing according to the film code. Also, the film code can also identify the remote location address which is to be contacted.

It is specifically contemplated that the processing system, the system for manipulating digital images, the computer program product and the method to treat images be embodied as a minilab, a self-standing station, a kiosk-like station, an office station or a home station; however, the invention is not limited thereto.

The invention has been described in detail with particular reference to certain preferred embodiments thereof, but it will be understood that variations and modifications can be effected within the spirit and scope of the invention.

What is claimed is:

1. A processing system comprising:

a reader for obtaining a digital record of images on a film supplied to the processing system;

a film type identifier which identifies a film type of said film; and a controller which receives a signal from said film type identifier indicative of the film type of said film, such that when the identified film type is one which is recognized by said controller, said controller applies a modifying algorithm to said digital record to create a first modified digital record of said images based on the identified film type.

2. A processing system according to claim 1, wherein said reader is a scanner which scans said film.

3. A processing system according to claim 2, wherein said scanner is a digital scanner.

4. A processing system according to claim 3, wherein said digital scanner is a film scanner.

5. A processing system according to claim 2, further comprising:

a developing station which applies a chemical development process to said film before said film is scanned by said scanner.

6. A processing system according to claim 5, wherein said film type identifier is adapted to identify the film type of said film based on an output response of said film to said chemical development process.

7. A processing system according to claim 1, further comprising a remote server, said controller being adapted to send a remote signal to said remote server when the film type identified by said film type identifier is not recognized by said controller, said remote server being adapted to identify the film type not recognized by said controller and provide a remote algorithm to said controller which is applied to said digital record to create a second modified digital record of said images based on the film type identified by said remote server.

8. A processing system according to claim 5, further comprising a monitoring system which monitors chemical constituents of processing solution at said developing station, said monitoring system identifying a chemistry based digital record modifier based on deviations in development caused by specific deviations in the processing solution and providing a signal to said controller indicative thereof, wherein if said chemistry based digital record modifier is recognized by said controller, said controller applies a chemical development correction algorithm to said first modified digital record.

9. A processing system according to claim 8, further comprising a remote server, wherein if said chemistry based digital record modifier is not recognized by said controller, said controller calls said remote server to request a remote chemical development correction algorithm, said controller thereby applying said remote development correction algorithm to said first modified digital record.

10. A processing system according to claim 1, wherein said film is carried within an enclosure having an identification code thereon, said identification code comprising information on at least the type of film in said enclosure, said film type identifier being adapted to read said identification code and identify the film type of said film based on said identification code.

11. A processing system according to claim 1, wherein an identification code is provided on said film in one of a magnetic, optical or mechanical manner, said identification code comprising information on at least the type of film on which is provided said identification code, said film type identifier being adapted to read said identification code and identify said film based on said identification code.

12. A processing system according to claim 1, wherein an identification code is provided on a microchip located on one of said film or an enclosure in which said film said provided, said identification code comprising information on at least the type of film, said film type identifier being adapted to read said identification code and identify said film based on said identification code.

13. A system for manipulating digital images, the system comprising:

a reading device which obtains a first digital record of first images obtained from a first film type and a second digital record of second images obtained from a second film type, said first and second film types each having a different output response after being exposed to the same development process for development of the first images on said first film type and the second images on the second film type; and a controller which applies a first computer algorithm to the first images obtained from the first film type so as to provide a first modified digital record of said first images having a first predetermined color characteristic, and applies a second computer algorithm to the second images obtained from the second film type so as to provide a second modified digital record of said second images having a second predetermined color characteristic.

14. A system according to claim 13, wherein said reading device is a digital scanner.

15. A system according to claim 14, wherein said digital scanner is a film scanner.

16. A system according to claim 13, further comprising a monitoring system which monitors a chemical development process used to develop the first and second film types, said monitoring system providing a signal to said controller for applying a correction algorithm to the first and second images based on deviations in development caused by deviations in processing solution used in the chemical development process.

17. A system according to claim 16, further comprising a remote server operationally associated with said controller and accessed by said controller to retrieve any of said first and second computer algorithms and said correction algorithm which is not recognized by said controller.

18. A processing method comprising the steps of:

reading a film to obtain a digital record of images on said film;

identifying a film type of said film; and providing information regarding the film type of said film to a controller;

wherein:

when said identified film type is recognized by said controller, said controller applies a modifying algorithm to said digital record to create a first modified digital record, said modifying algorithm being based on said identified film type and being stored in said controller; and when said identified film type is not recognized by said controller, said controller accesses a remote server which is adapted to identify the film type not recognized by said controller and provide a remote algorithm to said controller which is applied to said digital record to create a second modified digital record, said remote algorithm being based on the film type identified by said remote server.

19. A method according to claim 18, comprising the further step of:

applying a chemical development process to said film prior to said reading step.

20. A method according to claim 19, comprising the further step of:

monitoring chemical constituents of processing solution applied in said chemical development process; and identifying a chemistry based digital record modifier based on deviations in development caused by specific deviations in the processing solution and providing a signal to said controller indicative thereof;

wherein:

when said chemistry based digital record modifier is recognized by said controller, said controller applies a chemical development correction algorithm to said first or second modified digital record, said chemical development correction algorithm being stored in said controller; and when said chemistry based digital record modifier is not recognized by said controller, said controller accesses said remote server to request a remote chemical development correction algorithm which is applied to said first or second modified digital record.

21. A method of manipulating digital images, the method comprising the steps of:

obtaining a first digital record of first images obtained from a first film type and a second digital record of second images obtained from a second film type, said first and second film types each having a different output response after being exposed to the same development process for development of the first images on the first film type and the second images on the second film type;

applying a first computer algorithm to the first images obtained from the first film type so as to provide a first modified digital record of said first images having a first predetermined color characteristic; and applying a second computer algorithm to the second images obtained from the second film type so as to provide a second modified digital record of said second images having a second predetermined color characteristic.

22. A method according to claim 20, comprising the further steps of:

monitoring a chemical development process used to develop the first and second film types so as to detect deviations in development caused by deviations in processing solution used in the chemical development process; and applying a correction algorithm to said first and second images based on said detected deviations.

23. A method according to claim 21, comprising the further step of accessing a remote server to obtain any of said first and second computer algorithms and said correction algorithm.

24. A computer program product comprising:

a computer readable storage medium having a computer program thereon which when loaded into a computer, causes the computer to perform the following steps:

read a film to obtain a digital record of images on said film;

identify a film type of said film; and provide information regarding the film type of said film to a controller;

wherein:

when said identified film type is recognized by said controller, said controller applies a modifying algorithm to said digital record to create a first modified digital record, said modifying algorithm being based on said identified film type and being stored in said controller; and when said identified film type is not recognized by said controller, said controller accesses a remote server which is adapted to identify the film type not recognized by said controller and provide a remote algorithm to said controller which is applied to said digital record to create a second modified digital record, said remote algorithm being based on the film type identified by said remote server.

25. A computer program according to claim 24, wherein the program further causes the computer to perform the step of:

applying a chemical development process to said film prior to said reading step.

26. A computer program according to claim 25, wherein the program further causes the computer to perform the step of:

monitoring chemical constituents of processing solution applied in said chemical development process; and identifying a chemistry based digital record modifier based on deviations in development caused by specific deviations in the processing solution and providing a signal to said controller indicative thereof;

wherein:

when said chemistry based digital record modifier is recognized by said controller, said controller applies a chemical development correction algorithm to said first or second modified digital record, said chemical development correction algorithm being stored in said controller; and when said chemistry based digital record modifier is not recognized by said controller, said controller accesses said remote server to request a remote chemical development correction algorithm which is applied to said first or second modified digital record.

27. A processing system comprising:

a reader for obtaining a digital record of images from an electronic image bearing file supplied to the processing system;

an image capture device type identifier which identifies an image capture device type of said file; and a controller which receives a signal from said image capture device type identifier indicative of the image capture device type of said file, such that when the identified image capture device type is one which is recognized by said controller, said controller applies a modifying algorithm to said digital record to create a first modified digital record of said images based on the identified image capture device type.

28. The processing system according to claim 27, wherein said image capture device type is a photographic film.

29. A processing method comprising the steps of:

reading an electronic image bearing file to obtain a digital record of images from said file;

identifying an image capture device type of said file; and providing information regarding the image capture device type of said file to a controller;

wherein:

when said identified image capture device type is recognized by said controller, said controller applies a modifying algorithm to said digital record to create a first modified digital record, said modifying algorithm being based on said identified image capture device type and being stored in said controller; and when said identified image capture device type is not recognized by said controller, said controller accesses a remote server which is adapted to identify the image capture device type not recognized by said controller and provide a remote algorithm to said controller which is applied to said digital record to create a second modified digital record, said remote algorithm being based on the image capture device type identified by said remote server.

30. A method according to claim 29, wherein said image capture device type is a photographic film.

31. A computer program product comprising:

a computer readable storage medium having a computer program thereon which when loaded into a computer, causes the computer to perform the following steps:

read an electronic image bearing file to obtain a digital record of images from said file;

identify an image capture device type of said file; and provide information regarding the image capture device type of said file to a controller;

wherein:

when said identified image capture device type is recognized by said controller, said controller applies a modifying algorithm to said digital record to create a first modified digital record, said modifying algorithm being based on said identified image capture device type and being stored in said controller; and when said identified image capture device type is not recognized by said controller, said controller accesses a remote server which is adapted to identify the image capture device type not recognized by said controller and provide a remote algorithm to said controller which is applied to said digital record to create a second modified digital record, said remote algorithm being based on the image capture device type identified by said remote server.

32. A computer program according to claim 31, wherein said image capture device type is a photographic film.

* * * * *